(12) United States Patent
Otsuki et al.

(10) Patent No.: US 12,358,191 B2
(45) Date of Patent: Jul. 15, 2025

(54) METHOD FOR MANUFACTURING MOLDED FOAM, AND MOLDED FOAM

(71) Applicant: SEKISUI PLASTICS CO., LTD., Osaka (JP)

(72) Inventors: Masaki Otsuki, Osaka (JP); Atsushi Fukuta, Osaka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 692 days.

(21) Appl. No.: 17/441,090

(22) PCT Filed: Dec. 16, 2019

(86) PCT No.: PCT/JP2019/049202
§ 371 (c)(1),
(2) Date: Sep. 20, 2021

(87) PCT Pub. No.: WO2020/194917
PCT Pub. Date: Oct. 1, 2020

(65) Prior Publication Data
US 2022/0168930 A1 Jun. 2, 2022

(30) Foreign Application Priority Data
Mar. 25, 2019 (JP) .................. 2019-056566

(51) Int. Cl.
B29C 44/34 (2006.01)
B29C 44/58 (2006.01)
B60N 2/90 (2018.01)
B29L 31/30 (2006.01)

(52) U.S. Cl.
CPC .............. B29C 44/35 (2013.01); B29C 44/58 (2013.01); B60N 2/90 (2018.02); B29L 2031/30 (2013.01)

(58) Field of Classification Search
CPC .......... B29C 44/35; B29C 44/58; B60N 2/90; B29L 2031/30
See application file for complete search history.

(56) References Cited

FOREIGN PATENT DOCUMENTS

JP 2016-175683 10/2016

OTHER PUBLICATIONS

Matsumoto et al., "JPH0542610A—Translation," Feb. 23, 1993, JPO, pp. 1-8 (Year: 1993).*

(Continued)

Primary Examiner — Maria V Ewald
Assistant Examiner — Ethan Weydemeyer
(74) Attorney, Agent, or Firm — Wenderoth, Lind & Ponack, L.L.P.

(57) ABSTRACT

Provided are a method for manufacturing a molded foam, and a molded foam. A method for manufacturing a molded foam includes: a molding step of molding the molded foam; and a releasing step of opening a fixed mold and a mobile mold and extruding the molded foam from the fixed mold by an ejector pin. The molded foam has an inclined face that is inclined relative to a direction of opening the mold. The inclined face has a recess for extruding of the molded foam by the ejector pin. The tip surface of the ejector pin has a first extruding surface that is perpendicular to the mold opening direction and forms a bottom face of the recess, and a second extruding surface that is inclined relative to the first extruding surface.

7 Claims, 12 Drawing Sheets

(56) References Cited

OTHER PUBLICATIONS

Suzuta et al., "JP2011042149A—Translation," Mar. 3, 2011, JPO, pp. 1-18 (Year: 2011).*
International Search Report issued Mar. 17, 2020 in International Application No. PCT/JP2019/049202.

* cited by examiner

METHOD FOR MANUFACTURING MOLDED FOAM, AND MOLDED FOAM

TECHNICAL FIELD

The present invention relates to a method for manufacturing a molded foam using a mold including a pair of pieces of the mold and an ejector pin, and a molded foam.

BACKGROUND ART

Conventionally, molded foams have been used as seats for vehicles such as automobiles and for boxes for packaging items. Molded foams are typically manufactured by pre-foaming resin particles, placing the pre-foamed particles in a mold, heating them with steam for re-foaming, cooling it with cooling water or the like, and then releasing it from the mold.

Specifically, the mold includes a pair of pieces of the mold that are relatively movable and an ejector pin that pushes the molded foam out of one of the pieces after molding. A molded foam is prepared by forming it in the cavity of the mold, moving the pair of pieces of the mold relatively to open the mold, and pushing the molded foam from one of the pieces of the mold with the ejector pin.

The ejector pin is movable along the opening direction of the mold, and has a tip surface perpendicular to the opening direction. When a portion on the outer surface of the molded foam to be pressed by the ejector pin (hereinafter referred to as a pressed portion) is perpendicular to the mold opening direction, the pressed portion will be parallel to the tip surface of the ejector pin. In this case, the ejector pin pushes the molded foam out of the mold without generating irregularities on the outer surface of the molded foam.

Note here that the shape of a molded foam is not allowed to change significantly in order to achieve the requirements for the molded foam. This means that the pressed portion on the outer surface of a molded foam may be inclined from the mold opening direction. In that case, a recess for extrusion by the ejector pin is formed on the inclined outer surface of the molded foam so as to allow the entire tip surface of the ejector pin, which is formed perpendicular to the mold opening direction, to press the molded foam.

JP 2016-175683 A, for example, discloses a method for manufacturing a molded foam using a mold including a pair of pieces of mold and an ejector pin.

SUMMARY OF INVENTION

Technical Problem

A molded foam may have a pressed portion on the outer surface that has a small inclination angle relative to the opening direction of the mold. In that case, a deep recess for extrusion has to be formed on the inclined outer surface of the molded foam so that the entire tip surface of the ejector pin perpendicular to the mold opening direction presses the molded foam. This degrades the strength around the recess of the molded foam.

If the entire tip surface of the ejector pin is formed parallel to the outer surface of the molded foam without forming a recess in the molded foam, then the pushing force of the ejector pin against the outer surface of the molded foam increases also in the direction perpendicular to the extrusion direction (mold opening direction). As a result, the tip surface of the ejector pin slips on the outer surface of the molded foam, which causes scratches on the outer surface of the molded foam or degrades the releasability of the molded foam.

In view of this, the present invention provides a method for manufacturing a molded foam, and a molded foam. The method is capable of suppressing a decrease in strength of the molded foam and providing good releasability from the mold for a molded foam having a portion of the outer surface to be pressed by an ejector pin that is inclined relative to the mold opening direction.

Solution to Problem

In view of these points, a method for manufacturing a molded foam according to the present invention manufactures a molded foam with a mold including a pair of pieces of the mold and an ejector pin. The method includes the steps of: a molding step of molding the molded foam in a cavity of the mold; and a releasing step of opening the mold by relatively moving the pair of pieces of the mold, and extruding the molded foam from one of the pieces of the mold by the ejector pin. The molded foam has an inclined face that is inclined relative to a direction of opening the mold. The inclined face has a recess configured to let the ejector pin extrude the molded foam. The ejector pin has a tip surface that pushes the molded foam out of the one of the pieces of the mold. The tip surface has: a first extruding surface that is perpendicular to the mold opening direction and forms a bottom face of the recess; and a second extruding surface that is inclined relative to the first extruding surface and forms a part of the inclined face.

In the method for manufacturing a molded foam of the present invention, the inclined face of the molded foam has a recess configured to let the ejector pin extrude the molded foam. The tip surface of the ejector pin has the first extruding surface that is perpendicular to the mold opening direction and forms the bottom face of the recess, and the second extruding surface that is inclined relative to the first extruding surface and forms a part of the inclined face. This configuration makes the recess on the outer surface of the molded foam shallower and smaller than the configuration having the entire tip surface of the ejector pin perpendicular to the mold opening direction so that the entire tip surface of the ejector pin presses the molded foam. This suppresses a decrease in strength around the recess of the molded foam.

As compared with a molded foam without the recess and an ejector pin having the entire tip surface parallel to the outer surface of the molded foam, this configuration keeps an enough component of the pressing force against the molded foam in the mold opening direction and makes the component in the direction perpendicular to the mold opening direction (extrusion direction) smaller. This configuration suppresses slipping of the tip surface of the ejector pin on the outer surface of the molded foam, and thus suppresses scratches on the outer surface of the molded foam or degradation of the releasability of the molded foam.

The tip surface includes the first extruding surface perpendicular to the mold opening direction and the second extruding surface that forms a part of the inclined face. This configuration allows not only the first extruding surface but also the second extruding surface of the ejector pin to extrude the molded foam. This suppresses the concentration of a pressing force on the portion of the molded foam pressed by the first extruding surface, and thus suppresses a damage of the molded foam during extrusion (during releasing).

In the method for manufacturing the molded foam, preferably the first extruding surface has a first end on the opposite side of the second extruding surface, and the second extruding surface has a second end on the opposite side of the first extruding surface. A straight line that passes through the first end and extends in the mold opening direction and a plane that passes through the second end and is perpendicular to the mold opening direction intersect at an intersection, and the intersection is located outside of the cavity during the molding step. Some molded foams cannot be pressed by the entire tip surface of the ejector pin that is perpendicular to the mold opening direction (i.e., when the entire tip surface of the ejector pin is perpendicular to the mold opening direction, the tip surface partially protrudes from the molded foam). In this case, the ejector pin as stated above having the tip surface including the first extruding surface perpendicular to the mold opening direction and the second extruding surface inclined relative to the first extruding surface is very effective.

In the method for manufacturing molded foam, preferably, the second extruding surface is inclined by 20° or more and 70° or less relative to the first extruding surface. In other words, the inclined face of the molded foam is inclined by 20° or more and 70° or less relative to the direction perpendicular to the mold opening direction. In this way, when the inclined face of the molded foam is 20° or more relative to the direction perpendicular to the mold opening direction, the recess will become very deep to have the entire tip surface of the ejector pin to be perpendicular to the mold opening direction and to press the molded foam with the entire tip surface of the ejector pin. Or the molded foam may not have the recess and the entire tip surface of the ejector pin may be formed parallel to the outer surface of the molded foam. In that case, the pressing force of the molded foam in the direction perpendicular to the extrusion direction (mold opening direction) will increase. Considering them, when the second extruding face is inclined relative to the first extruding face by 20° or more, the tip surface of the ejector pin having the first extruding surface perpendicular to the mold opening direction and the second extruding surface inclined relative to the first extruding surface is very effective.

When the inclined face of the molded foam is inclined by 70° or less relative to the direction perpendicular to the mold opening direction, the present invention allows not only the first extruding surface but also the second extruding surface to extrude the molded foam. This configuration therefore suppresses the concentration of a pressing force on the portion of the molded foam pressed by the first extruding surface.

In the method for manufacturing a molded foam, viewed from the mold opening direction, an area ratio of the first extruding surface to the tip surface is preferably 25% or more and 75% or less. In this way, the present invention is configured so that, viewed from the mold opening direction, the area ratio of the first extruding surface to the tip surface is 25% or more. This configuration easily achieves the force of extruding by the first extruding surface. The present invention is configured so that, viewed from the mold opening direction, the area ratio of the first extruding surface to the tip surface is 75% or less. This configuration easily suppresses an increase of the recess in size.

In the method for producing a molded foam, preferably the molded foam has a rectangular outer shape having short sides extending in a transverse direction and long sides extending in a longitudinal direction in a plan view, the molded foam has a thick part on one side of the transverse direction, the molded foam has a thin part that is thinner than the thick part on the other side of the transverse direction, and the molding step forms a part of the thin part by the ejector pin. That is, the ejector pin presses on the thin portion of the molded foam. In this case, the tip surface of the ejector pin having the first extruding surface perpendicular to the mold opening direction and the second extruding surface inclined relative to the first extruding surface is very effective.

A molded foam according to the present invention undergoes molding with a mold, and the molded foam includes: an inclined face that is inclined relative to a mold opening direction of the mold; a recess on the inclined face, the recess being configured to let the ejector pin extrude the molded foam; and a pin mark formed by a tip surface of the ejector pin. The pin mark has: a first region placed perpendicular to the mold opening direction and defines a bottom face of the recess; and a second region that is inclined relative to the first region and defines a part of the inclined face.

According to the molded foam of the present invention, the molded foam has the recess on the inclined face that is inclined relative to the mold opening direction, and the recess is configured to let the ejector pin extrude the molded foam. The pin mark has: the first region placed perpendicular to the mold opening direction and defines a bottom face of the recess; and the second region that is inclined relative to the first region and defines a part of the inclined face. This configuration makes the recess on the outer surface of the molded foam shallower and smaller than the configuration of placing the entire pin mark perpendicular to the mold opening direction (i.e., the configuration having the entire tip surface of the ejector pin formed perpendicular to the mold opening direction so that the entire tip surface of the ejector pin presses the molded foam). This suppresses a decrease in strength around the recess of the molded foam.

As compared with a molded foam having the entire pin mark to be along an inclined face (i.e., without the recess and an ejector pin having the entire surface parallel to the outer surface of the molded foam), this configuration keeps an enough component of the pressing force against the molded foam in the mold opening direction and makes the component in the direction perpendicular to the mold opening direction (extrusion direction) smaller. This configuration suppresses slipping of the tip surface of the ejector pin on the outer surface of the molded foam, and thus suppresses scratches on the outer surface of the molded foam or degradation of the releasability of the molded foam.

The pin mark has: the first region placed perpendicular to the mold opening direction; and the second region that defines a part of the inclined face. This means that not only the first region but also the second region receives a pressing force from the ejector pin. This suppresses the concentration of a pressing force on the first region, and thus suppresses a damage of the molded foam during extrusion (during releasing).

In the molded foam, preferably the first region has a first end on the opposite side of the second region, the second region has a second end on the opposite side of the first region, and a straight line that passes through the first end and extends in the mold opening direction and a plane that passes through the second end and is perpendicular to the mold opening direction intersect at an intersection, and the intersection is located outside of the molded foam. Some molded foams cannot be pressed by the entire tip surface of the ejector pin that is perpendicular to the mold opening direction (i.e., when the entire tip surface of the ejector pin is perpendicular to the mold opening direction, the tip surface partially protrudes from the molded foam). In this case, the pin mark as stated above having the first region perpendicular to the mold opening direction and the second region inclined relative to the first region is very effective.

In the molded foam, preferably, the second region is inclined by 20° or more and 70° or less relative to the first region. That is, the inclined face of the molded foam is inclined by 20° or more and 70° or less relative to the direction perpendicular to the mold opening direction. In this way, when the inclined face of the molded foam is 20° or more relative to the direction perpendicular to the mold opening direction, the recess will become very deep to have the entire tip surface of the ejector pin to be perpendicular to the mold opening direction and to press the molded foam with the entire tip surface of the ejector pin. Or the molded foam may not have the recess and the entire tip surface of the ejector pin may be formed parallel to the outer surface of the molded foam. In that case, the pressing force of the molded foam in the direction perpendicular to the extrusion direction (mold opening direction) will increase. Considering them, when the second region is inclined relative to the first region by 20° or more, the pin mark having the first region perpendicular to the mold opening direction and the second region inclined relative to the first region is very effective.

When the inclined face of the molded foam is inclined by 70° or less relative to the direction perpendicular to the mold opening direction, not only the first region but also the second region receives a pressing force from the ejector pin, and this further suppresses the concentration of the pressing force on the first region.

In the molded foam, viewed from the mold opening direction, an area ratio of the first region to the pin mark is preferably 25% or more and 75% or less. In this way, the present invention is configured so that, viewed from the mold opening direction, the area ratio of the first region to the pin mark is 25% or more. This configuration easily achieves the force acting on the first region in the mold opening direction. The present invention is configured so that, viewed from the mold opening direction, the area ratio of the first region to the pin mark is 75% or less. This configuration easily suppresses an increase of the recess in size.

In the molded foam, preferably the molded foam has a rectangular outer shape having short sides extending in a transverse direction and long sides extending in a longitudinal direction in a plan view, the molded foam has a thick part on one side of the transverse direction, the molded foam has a thin part that is thinner than the thick part on the other side of the transverse direction, and the recess and the pin mark are located at the thin part. That is, the ejector pin presses on the thin portion of the molded foam. In this case, the pin mark having the first region perpendicular to the mold opening direction and the second region inclined relative to the first region is very effective.

Advantageous Effects of Invention

The present invention provides a method for manufacturing a molded foam, and a molded foam. The method is capable of suppressing a decrease in strength of the molded foam and providing good releasability from the mold for a molded foam having a portion of the outer surface to be pressed by an ejector pin that is inclined relative to the mold opening direction.

DESCRIPTION OF EMBODIMENTS

The following describes one embodiment of a molded foam and a method for manufacturing the molded foam according to the present invention, with reference to the drawings.

1. Vehicular Seat Member 10

Figure 1:
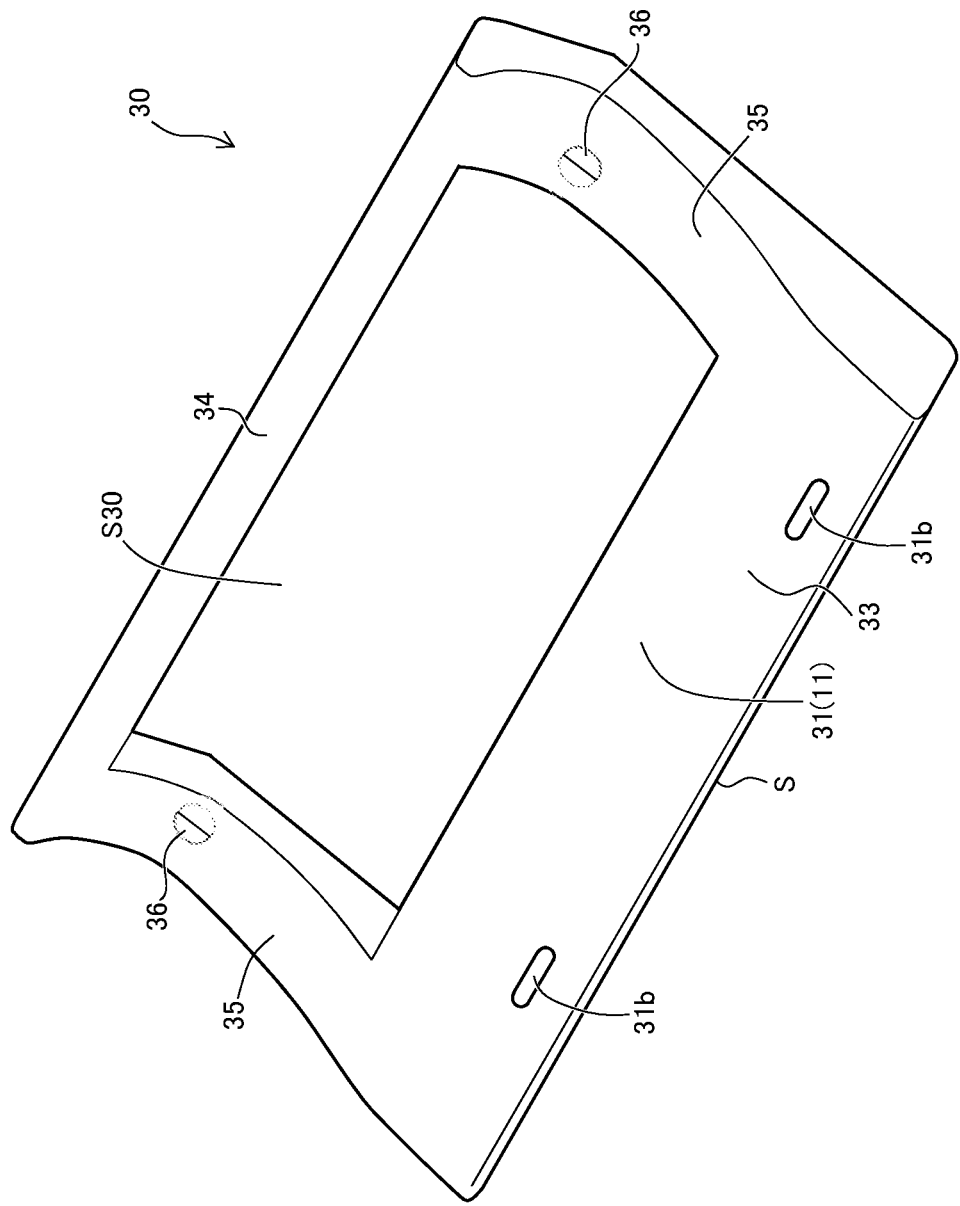
FIG. 1 is a perspective view showing the configuration of a molded foam according to one embodiment of the present invention.
Figure 2:
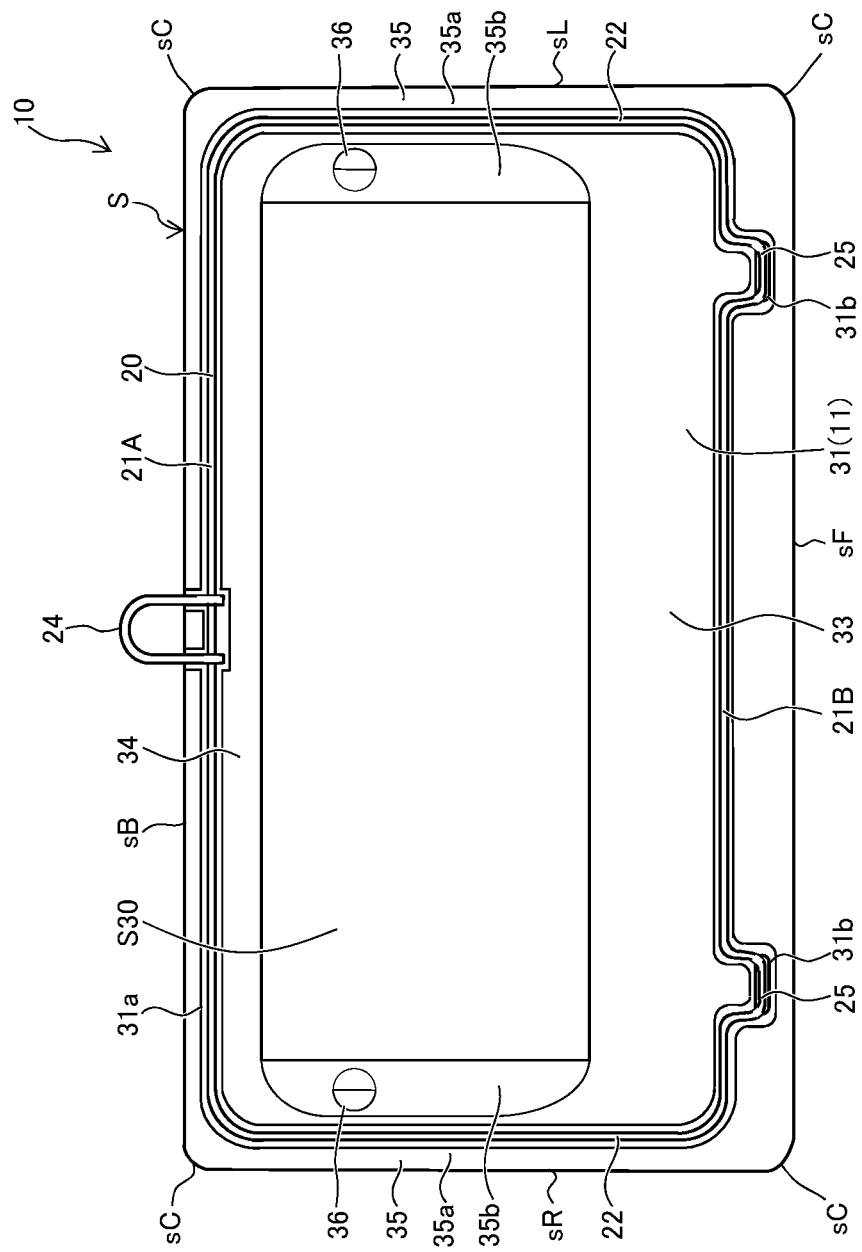
FIG. 2 is a plan view showing the configuration of a vehicular seat member including the molded foam according to one embodiment of the present invention.
Figure 3:
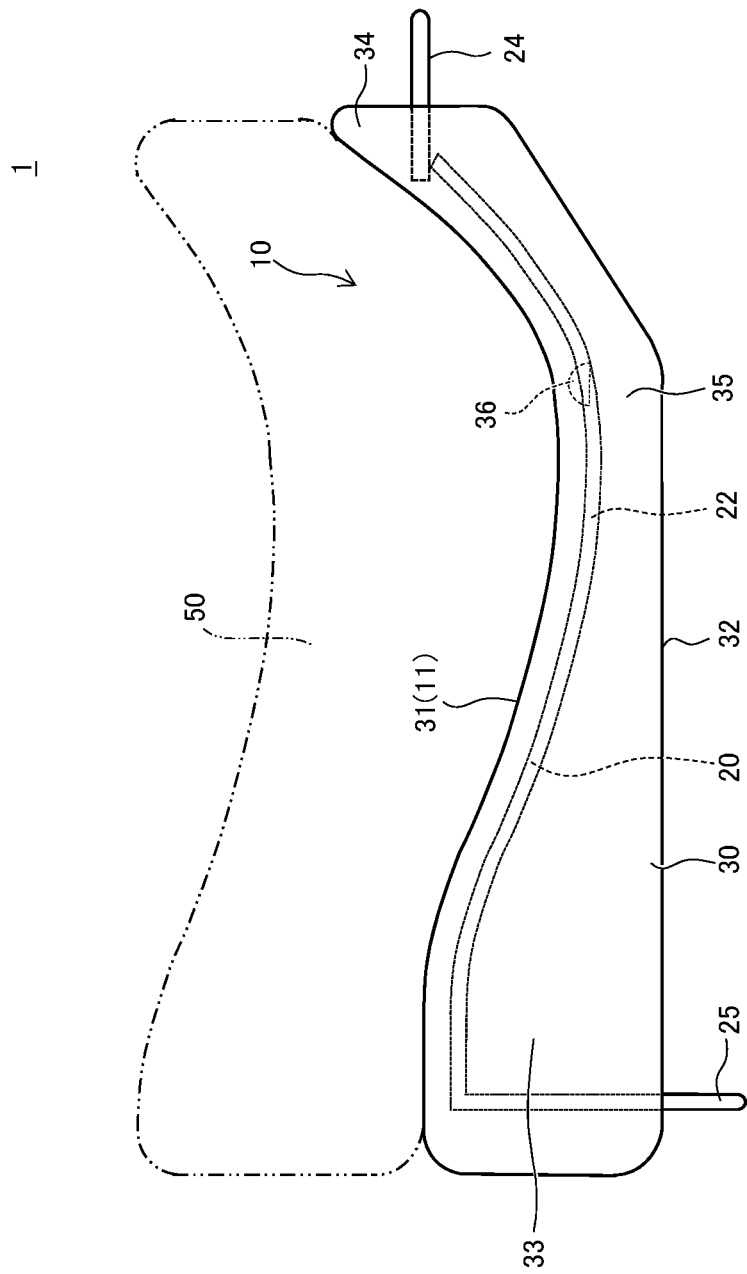
FIG. 3 is a side view showing the configuration of a vehicular seat including the molded foam according to one embodiment of the present invention.

FIG. 1 is a perspective view showing the configuration of a molded foam 30 according to one embodiment of the present invention. FIG. 2 is a plan view showing the configuration of a vehicular seat member 10 including the molded foam 30 according to one embodiment of the present invention. FIG. 3 is a side view showing the configuration of a vehicular seat 1 including the molded foam 30 according to one embodiment of the present invention. For simplification, FIG. 1 omits a groove 31*a* and an inclined face 35*b* formed on an upper face 31 of the molded foam 30.

As shown in FIGS. 1 to 3, the vehicular seat member 10 basically includes a frame member 20 and a molded foam 30 to be attached to the frame member 20 according to one embodiment of the present invention.

As shown in FIG. 2, the outer shape S of the vehicular seat member 10 in the present embodiment is a rectangle having short sides and long sides in a plan view, and having a transverse direction and a longitudinal direction. The outer shape S has four sides, including a right edge sR and a left edge sL at the short sides and a front edge sF and a back (or rear) edge sB at the long sides as well as corners sC at the four corners. In this description, front, back (rear), left and right refer to the directions viewed from a passenger who is seated in the vehicle and faces in the travelling direction (forward) of the vehicle.

In one example of the vehicular seat member 10, as shown in FIG. 3, an upper seat member 50, such as an appropriate cushioning material, is overlaid on the upper face 11 of the vehicular seat member 10, i.e., on the upper face 31 of the molded foam 30 to be a vehicular seat 1. The vehicular seat member 10 together with the cushioning material may be covered with an appropriate exterior material to be the vehicular seat 1.

1-1. Frame Member 20

As shown in FIG. 2 and FIG. 3, the frame member 20 is to fix the molded foam 30 to a vehicle body frame (not shown). The frame member 20 is typically made of metal, such as steel or aluminum.

The frame member 20 has a substantially rectangular outline in a plan view, and has at least a pair of opposed first sides (long sides) 21A and 21B and a pair of opposed second sides (short sides) 22 and 22. The rectangular shape includes a square shape, an oblong shape, or the like. The second sides 22 and 22 are continuous to both ends of the first side 21A, and are continuous to both ends of the first sides 21B. That is, the pair of opposed second sides 22, 22 connects the ends of the first side 21A and of the first side 21B.

A U-shaped rear locking part 24 is attached at a center part of the first side 21A by welding, for example. A pair of U-shaped front locking parts 25 and 25 having a predetermined distance from each other is formed on the first side 21B. In one example, wire made of steel or aluminum is used for the rear locking part 24.

The rear locking part 24 and the front locking parts 25 of the frame member 20 lock the vehicular seat member 10 to the vehicle body frame. The rear locking part 24 projects rearward from the rear face of the molded formed 30, and is locked to the vehicle body frame. The front locking parts 25 are bends of the first side 21B, and project downward from the lower face 32 of the molded foam 30 near the front end of the molded foam 30 to be locked to the vehicle body frame. The front locking parts 25 each project downward from the lower face 32 of the molded foam 30 through a through hole 31b penetrating vertically at a predetermined position in the groove 31a described later. The frame member 20 is placed in the groove 31a described below. The groove 31a is formed in the upper face 31 of the molded foam 30 so that the frame member 20 in the groove 31a does not project from the upper face 31 of the molded foam 30.

In the present embodiment, the rear locking part 24 and the front locking parts 25 each have a substantially U-letter shape formed by bending the wire. They are not limited to this configuration, and may have any configuration suitable for the structure of the vehicle to lock the seat member to the vehicle. In the present embodiment, the front locking parts 25 are bends that are formed by bending the first side 21B. They are not limited to this configuration, and similar to the rear locking part 24, the front locking parts 25 also may be attached to the first side 21B by welding or the like. The number of the front locking parts 25 also is not limited especially, which may be one or three or more.

1-2. Molded Foam 30

As shown in FIGS. 1 to 4, the molded foam 30 is a molded resin foam prepared by forming expandable resin in a mold. The expandable resin is not limited especially, and a foamed thermoplastic resin is typically used. For instance, polystyrene expandable resin, composite expandable resin including polystyrene resin and polyolefin resin, and polyolefin expandable resin are preferably used. Expansion ratio can be adjusted appropriately for the types of expandable resin, which is generally about 10 to 50 times, and typically about 20 to 40 times.

The molded foam 30 has the upper face 31 on the side where a passenger of the vehicle is seated and the lower face 32 that comes in contact with the vehicle. On the upper face 31 of the molded foam 30, a groove 31a is formed so as to receive the frame member 20 inside. At a predetermined position, the groove 31a has a holder (not shown) for holding and fixing the frame member 20.

The molded foam 30 includes: a front part 33 that is a front part of the seat when the vehicular seat member 10 is attached to the vehicle body frame; a rear part 34 that is a rear part of the seat and is inclined upward rearward; and a pair of side parts 35 and 35 that connect both ends of the front part 33 and the rear part 34. These front part 33, rear part 34, and pair of side parts 35, 35 are integrally formed. The molded foam 30 has a frame shape, and has a space S30 at a central part. This space S30 is intended to make the molded foam 30 lighter in weight or to contain other members of the vehicular seat (e.g., a cushioning material and a console box that are easily deformed than the molded foam 30).

When the vehicular seat member 10 is assembled in a vehicle, the front part 33 of the molded foam 30 supports the upper legs of the passenger and the rear part 34 supports the buttock of the passenger. The front part 33 is a thick portion, and a part of the side parts 35 near the rear and the rear part 34 are thin portions that are thinner than the front part 33.

Specifically as shown in FIG. 3, the upper face 31 of the molded foam 30 is a curved surface that is depressed downward so that a part near the rear of the side part 35 is the deepest in the illustrated embodiment. Such a curved surface holds the upper legs and the buttock of a passenger via the upper seat member 50. The shape and the thickness of the molded foam 30 can change variously depending on the shape of the vehicle body to which the vehicular seat member 10 is attached, and are not limited to the illustrated embodiment.

Figure 4:
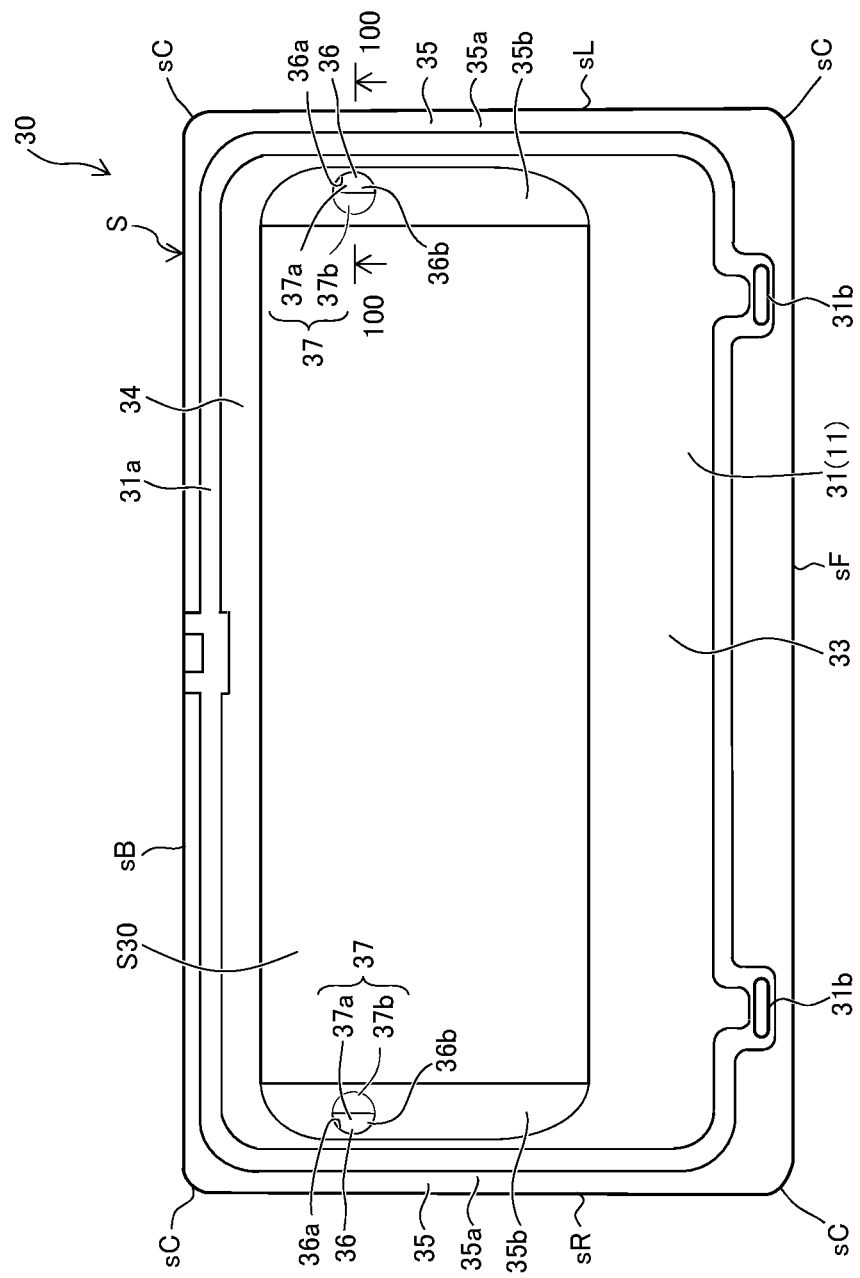
FIG. 4 is a plan view showing the configuration of a molded foam according to one embodiment of the present invention.
Figure 5:
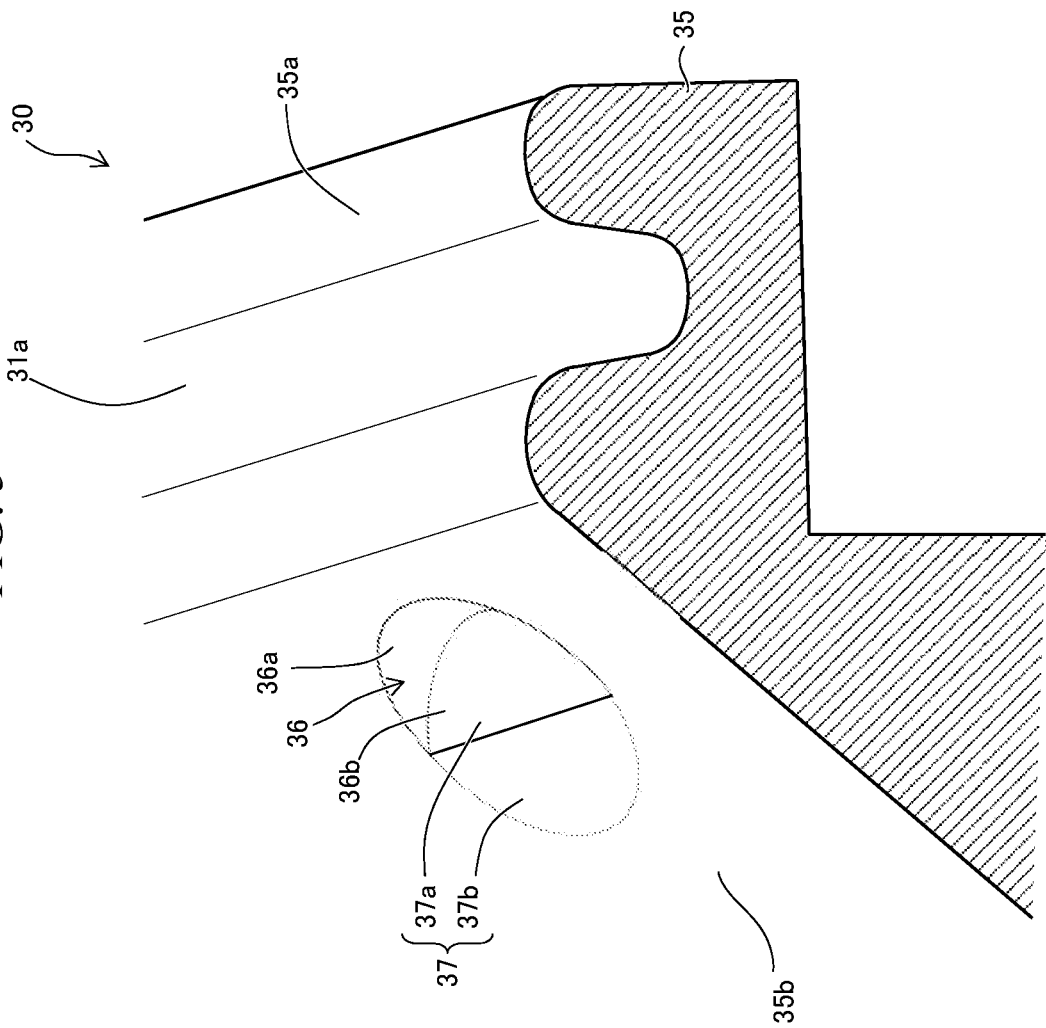
FIG. 5 is a cross-sectional perspective view showing the configuration around a recess of a molded foam according to one embodiment of the present invention.
Figure 6:
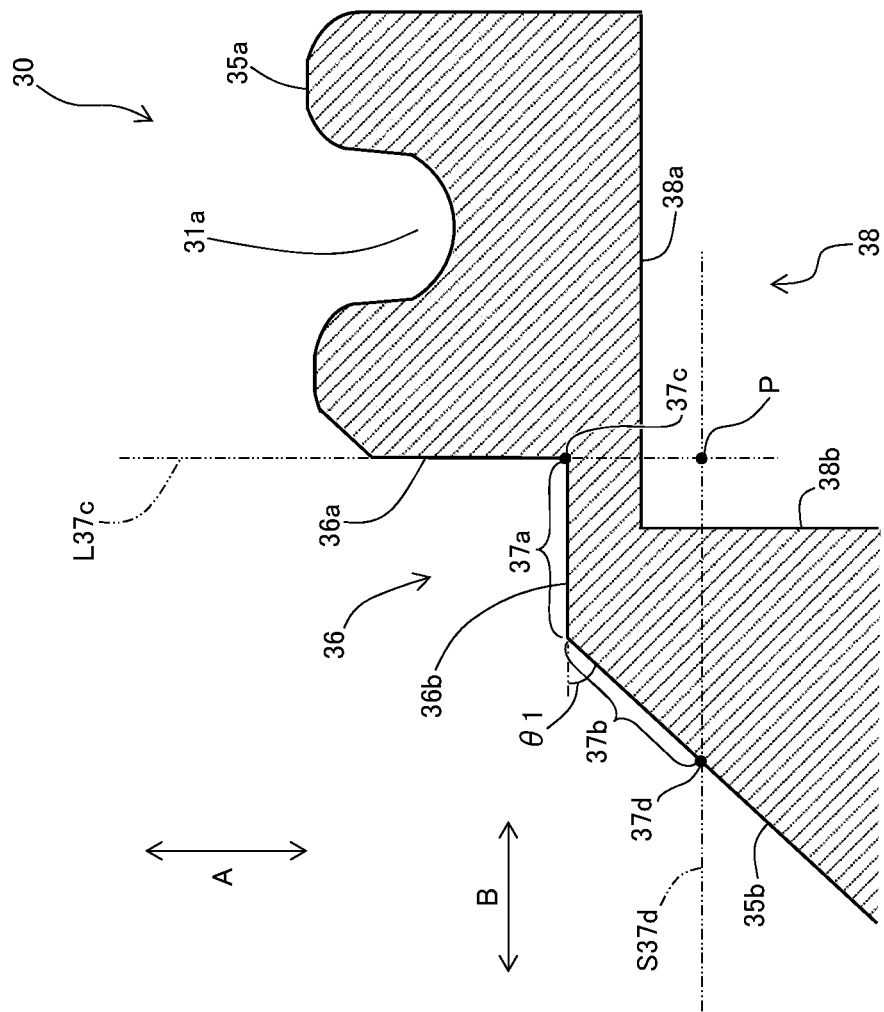
FIG. 6 is a cross-sectional view along the line 100-100 of FIG. 4.

As shown in FIGS. 4 to 6, the upper face of the side parts 35 has an upper end face 35a extending in a substantially horizontal direction in a cross-sectional view and an inclined face 35b inclined downward from the upper end face 35a toward the space S30. The groove 31a is formed in the upper end face 35a.

In the present embodiment, the inclined face 35b has a recess 36 for extruding the molded foam 30 by an ejector pin 60 of a mold 40 described later, and a pin mark 37 formed by a tip surface 61 of the ejector pin 60. In this embodiment, the upper end faces 35a of the side parts 35 each have the groove 31a, so that the upper end faces 35a do not have an enough area that can be pressed by a typical ejector pin. The present embodiment therefore is configured so that the ejector pin 60 presses the inclined face 35b.

The inclined face 35b is inclined relative to the mold opening direction (arrow A direction) of the mold 40 described later. In the present embodiment, the inclined face 35b is inclined by 20° or more and 70° or less (see θ1 in FIG. 6) relative to the direction perpendicular to the mold opening direction (arrow B direction), and preferably 40° or more and 70° or less.

The recess 36 is formed in a portion closer to the rear (deepest portion) of each side part 35. The molded foam 30 has a horizontally symmetrical structure, and the structure around the pair of recesses 36 also is horizontally symmetric. The following therefore describes the structure around one of the recesses 36 (on the right in FIG. 4), with reference to the drawings.

The recess 36 includes a side face 36a that is a part of a cylindrical surface and extends in the mold opening direction (arrow A direction), and a bottom face 36b that is perpendicular to the mold opening direction. The bottom face 36b has a substantially semicircular shape when viewed from the mold opening direction (arrow A direction).

The pin mark 37 extends from the recess 36 to the inclined face 35b. The pin mark 37 has a first region 37a defining the bottom face 36b of the recess 36, and a second region 37b that is inclined relative to the first region 37a and defines a part of the inclined face 35b. The first region 37a extends perpendicular to the mold opening direction, and the second region 37b extends along the inclined surface 35b. That is, the second region 37b is inclined by 20° or more and 70° or less (see θ1 in FIG. 6) relative to the first region 37a, and more preferably 40° or more and 70° or less.

As shown in FIG. 4, the area ratio of the first region 37a to the pin mark 37 (the total region including the first region 37a and the second region 37b) is 25% or more and 75% or less when viewed from the mold opening direction, and preferably 40% or more and 60% or less.

As shown in FIG. 6, the molded foam 30 has a lower recess 38 below the recess 36, and the lower recess 38 includes a top face 38a extending horizontally and a side face 38b extending downwardly from an end of the top face 38a. The recess 36 and the lower recess 38 overlap vertically (mold opening direction) having a thin part of the molded foam 30 therebetween. This means that the peripheral portion of the recess 36 of the molded foam 30 is particularly thin.

In the present embodiment, the first region 37a includes a first end 37c on the opposite side of the second region 37b, and the second region 37b includes a second end 37d on the opposite side of the first region 37a. A straight line L37c that passes through the first end 37c and extends in the mold opening direction and a plane S37d that passes through the second end 37d and is perpendicular to the mold opening direction intersect at intersection P, and this intersection P is located outside (in the lower recess 38) of the molded foam 30.

2. Foam Molding Device 4

Figure 7:
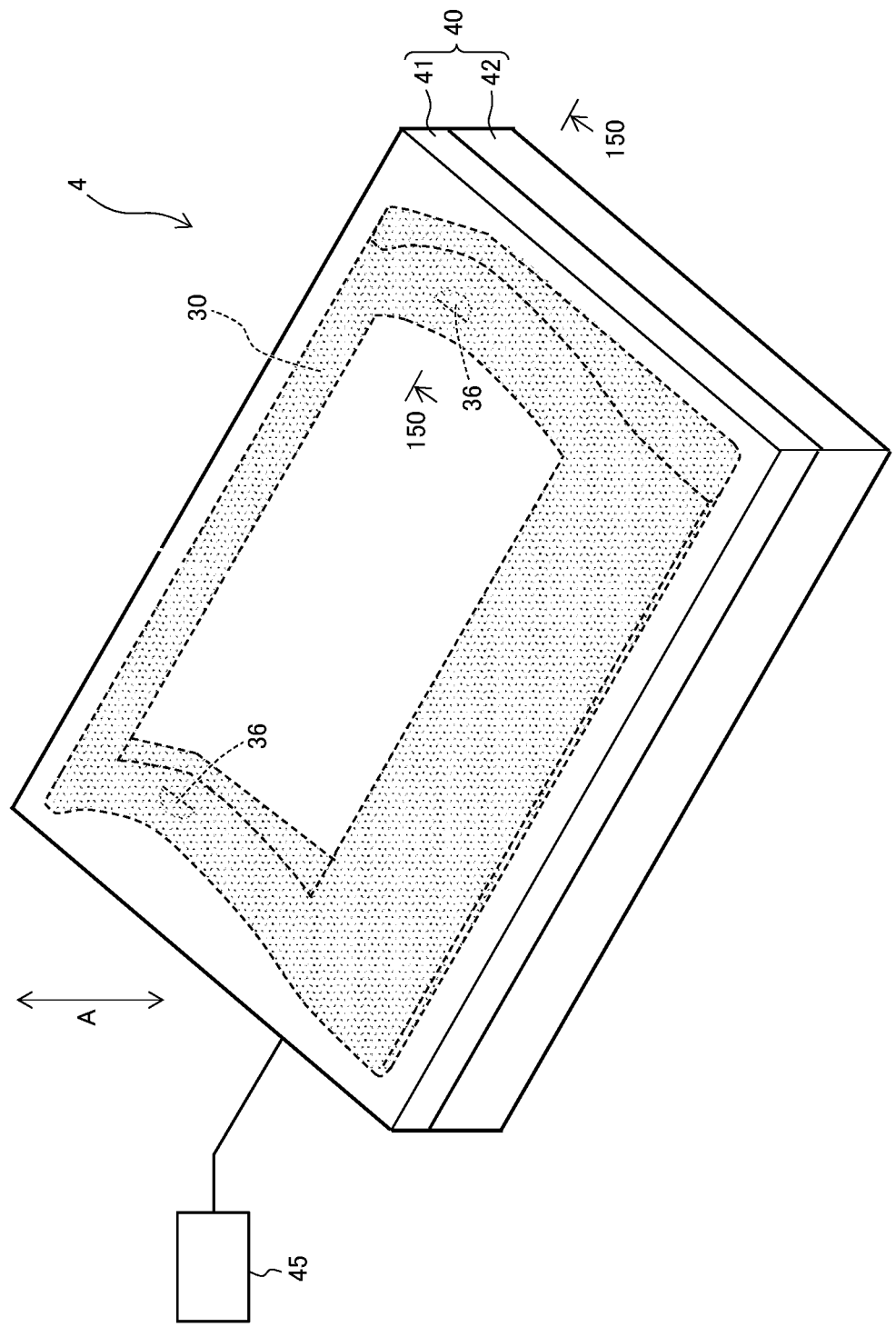
FIG. 7 shows the configuration of a foam molding device equipped with a mold for molding a molded foam according to one embodiment of the present invention.

As shown in FIG. 7, a foam molding device 4 includes a mold 40 to form a molded foam 30, a driver 45 configured to drive the mold 40, and a controller (not shown) configured to control the foam molding device 4 as a whole. The mold 40 includes a fixed mold 41 and a mobile mold 42. Translating the mobile mold 42 relative to the fixed mold 41 means clamping and opening of the mold 40 in the direction of arrow A in FIG. 7. The fixed mold 41 and the mobile mold 42 are examples of a "pair of molds" of the present invention.

The fixed mold 41 includes a plurality of ejector pins that extrudes the molded foam 30 from the fixed mold 41. The ejector pins move parallel to the mold opening direction. The drawings omit the ejector pins other than the ejector pin 60, which is a feature of the present invention. The detailed structure of the ejector pin 60 will be described later.

In one example, the driver 45 includes a drive cylinder, and the drive cylinder acts to move the mobile mold 42 relative to the fixed mold 41. Bringing the mobile mold 42 into contact with the fixed mold 41 closes the mold 40, and moving the mobile mold 42 away from the fixed mold 41 opens the mold 40. The driver 45 also includes an ejector drive cylinder that drives the ejector pin 60. The ejector drive cylinder acts to move the ejector pin 60 between a non-extruding position (position in FIG. 8) and an extruding position (position in FIG. 12).

Although the fixed mold 41 includes a plurality of ejector pins that extrudes the molded foam 30 from the fixed mold 41 as described above, the following describes the ejector pin 60 that is a feature of the present invention.

Figure 8:
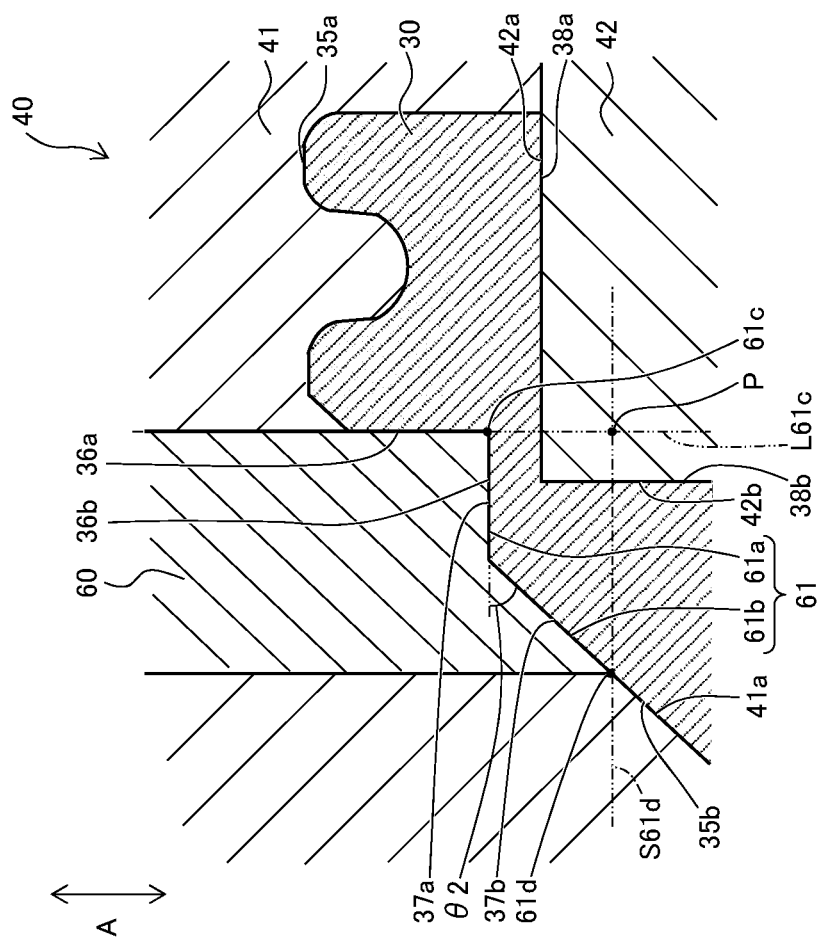
FIG. 8 is a cross-sectional view along the line 150-150 of FIG. 7.
Figure 9:
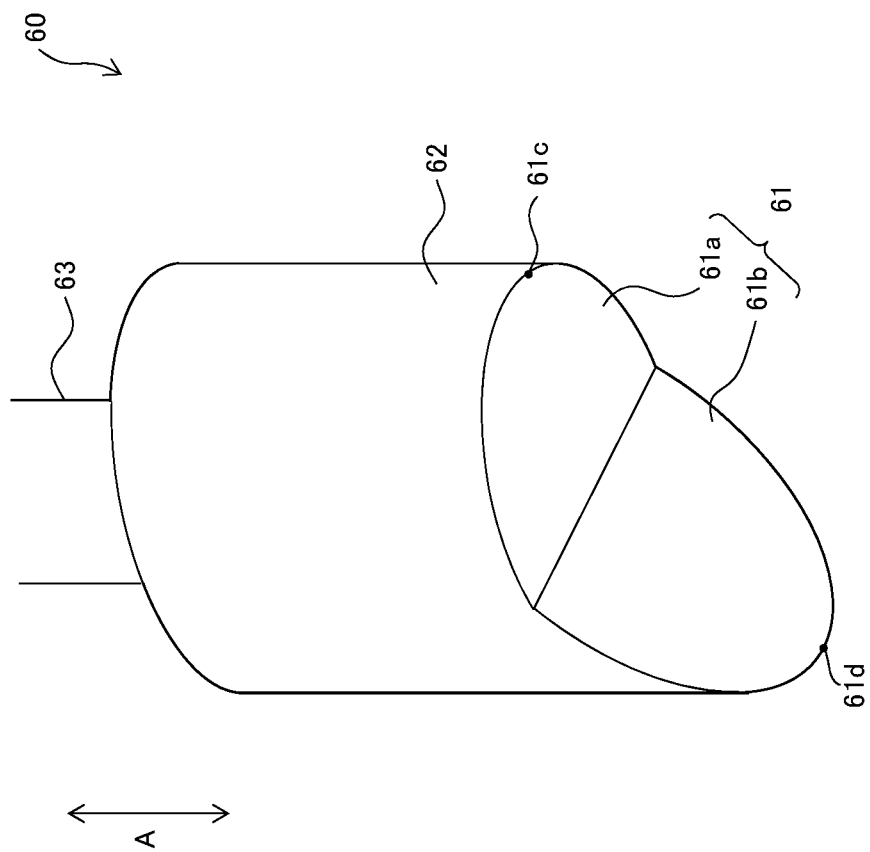
FIG. 9 is a perspective view showing the configuration of the ejector pin shown in FIG. 8 from the below.

As shown in FIGS. 8 and 9, the ejector pin 60 includes a body 62 having a tip surface 61 that extrudes the molded foam 30 from the fixed mold 41, and a shaft 63 to which the body 62 is attached. The body 62 has a diameter of 23 mm to 50 mm, for example. The tip surface 61 defines a cavity together with the fixed mold 41 and the mobile mold 42, and forms the surface of the molded foam 30.

In the present embodiment, the tip surface 61 has a first extruding surface 61a that is perpendicular to the mold opening direction (arrow A direction) and a second extruding surface 61b that is inclined relative to the first extruding surface 61a. The first extruding surface 61a forms the first region 37a (see FIG. 5) of the pin mark 37, and the second extruding surface 61b forms the second region 37b (see FIG. 5) of the pin mark 37. That is, the first extruding surface 61a forms the bottom face 36b of the recess 36 of the molded foam 30, and the second extruding surface 61b forms a part of the inclined face 35b. The mold 40 has a substantially horizontally symmetrical structure, and the pair of ejector pins 60 also is horizontally symmetric.

The second extruding surface 61b is inclined by 20° or more and 70° or less (see θ1 in FIG. 6) relative to the first extruding surface 61a, and preferably 40° or more and 70° or less. The fixed mold 41 has an inclined face 41a (see FIG. 8) that forms the inclined face 35b of the molded foam 30. The inclined face 41a is formed to be flush with the second extruding surface 61b of the ejector pin 60, and similar to the second extruding surface 61b, the inclined face 41a is inclined by 20° or more and 70° or less (preferably, 40° or more and 70° or less) relative to the first extruding surface 61a.

Viewed from the mold opening direction, the area ratio of the first extruding surface 61a to the tip surface 61 (the region including the first extruding surface 61a and the second extruding surface 61b) is 25% or more and 75% or less, preferably 40% or more and 60% or less.

In the present embodiment, the first extruding surface 61a has a first end 61c on the opposite side of the second extruding surface 61b, and the second extruding surface 61b has a second end 61d on the opposite side of the first extruding surface 61a. As shown in FIG. 8, a straight line L61c (=L37c) that passes through the first end 61c and extends in the mold opening direction and a plane S61d (=S37d) that passes through the second end 61d and is perpendicular to the mold opening direction intersect at an intersection P, and this intersection P is located outside of the cavity (space in which the molded foam 30 is formed) during the molding step described later. The mobile mold 42 has an upper face 42a that forms the top face 38a of the molded foam 30, and a side face 42b that forms the side face 38b.

3. Method for Manufacturing Molded Foam 30

Figure 10:
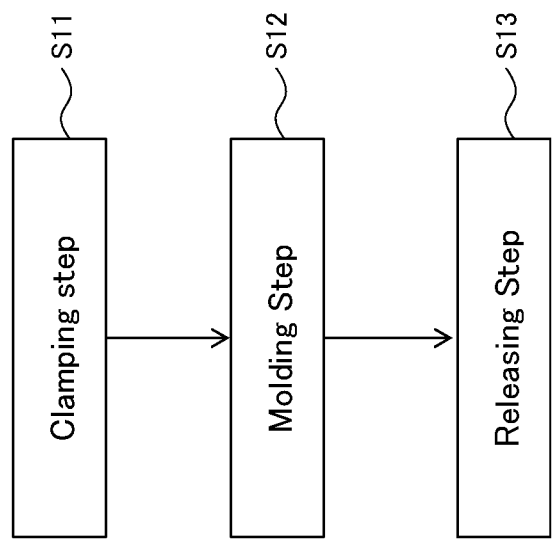
FIG. 10 is a flowchart of a method for manufacturing a molded foam shown in FIG. 1.

The molded foam 30 according to the present embodiment is manufactured by a series of steps from the clamping step S11 to the releasing step S13 shown in FIG. 10.

3-1. Clamping Step S11

The clamping step S11 closes the fixed mold 41 and the mobile mold 42 for clamping to define a cavity. At this time, the ejector pin 60 is placed at the non-extruding position (the position in FIG. 8).

3-2. Molding Step S12

Next the molding step S12 pre-expands expandable resin particles including resin and foaming agent, and pours the pre-expanded resin particles into the cavity of the clamped mold 40, followed by supplying of steam into the mold 40 so as to expand the pre-expanded resin particles, thus forming a molded foam 30 (see FIG. 8).

3-3. Releasing Step S13

Figure 11:
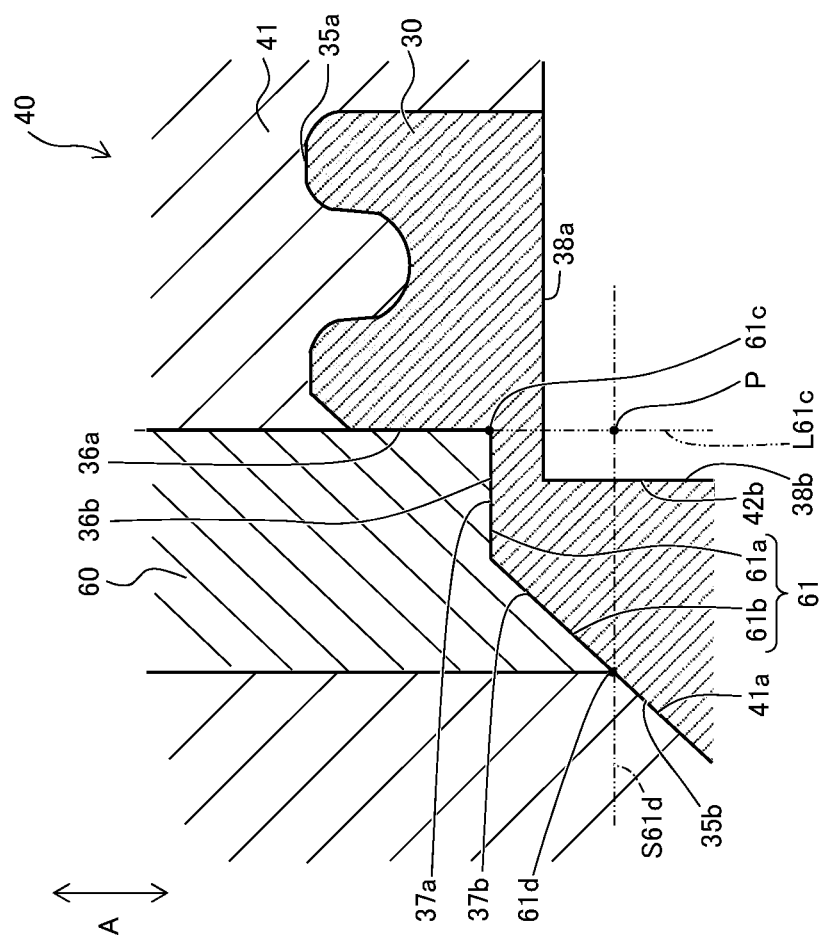
FIG. 11 is a cross-sectional view showing the state after FIG. 8, where the mobile mold and the fixed mold are opened.
Figure 12:
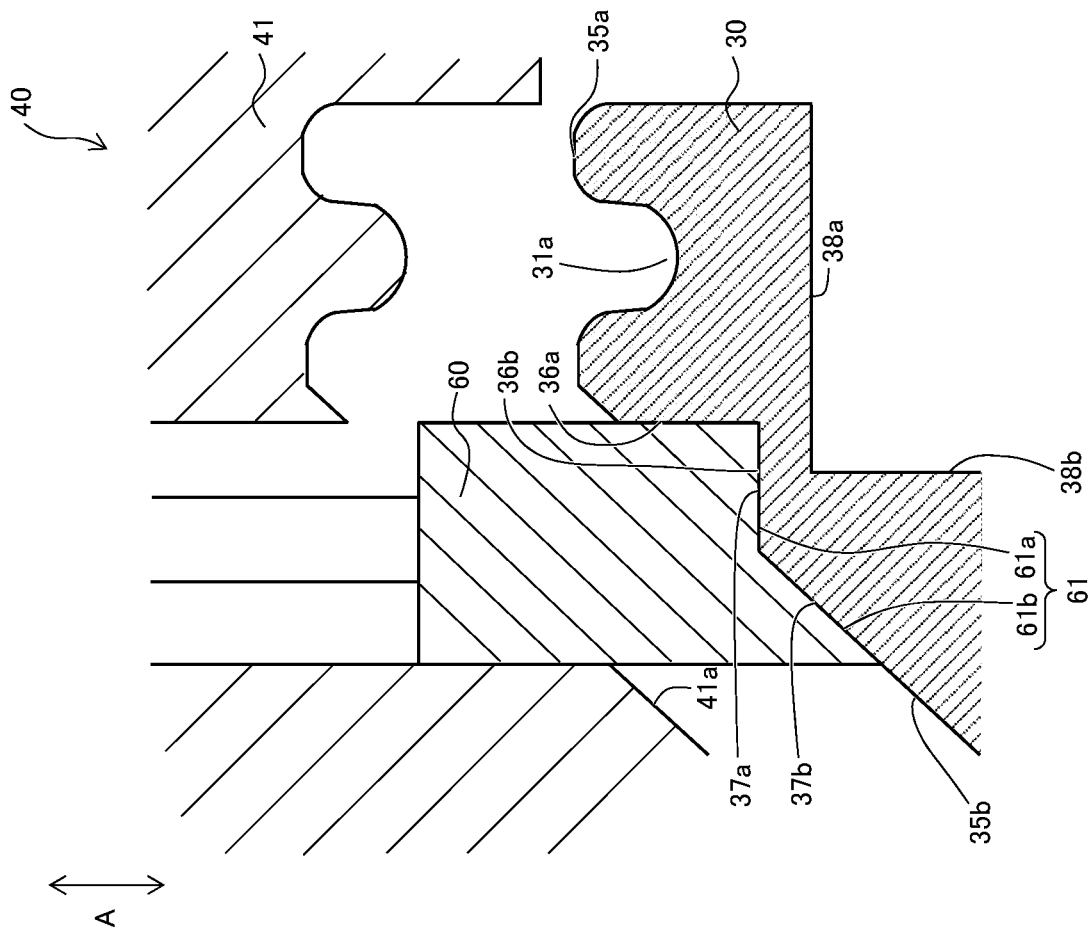
FIG. 12 is a cross-sectional view showing the state after FIG. 11, where the molded foam is extruded from the fixed mold by the ejector pin.

The releasing step S13 moves the mobile mold 42 away from the fixed mold 41 to open the mold 40. At this time, as shown in FIG. 11, the molded foam 30 is separated from the mobile mold 42 and is in close contact with the fixed mold 41. After that, as shown in FIG. 12, the ejector pins 60 attached to the fixed mold 41 and the other ejector pins not shown push the molded foam 30 out of the fixed mold 41 to release the molded foam 30 from the fixed mold 41.

As described above, the present embodiment is configured so that the inclined face 35b of the molded foam 30 has the recesses 36 for extruding by the ejector pins 60, and the tip surface 61 of each ejector pin 60 includes the first extruding surface 61a that is perpendicular to the mold opening direction and forms the bottom face 36b of the recess 36, and the second extruding surface 61b that is inclined relative to the first extruding surface 61a and forms a part of the inclined face 35b. This configuration makes the recesses 36 on the outer surface of the molded foam 30 shallower and smaller than the configuration having the entire tip surface 61 of the ejector pin 60 formed perpendicular to the mold opening direction so that the entire tip surface 61 of the ejector pin 60 presses the molded foam 30. This suppresses a decrease in strength around the recesses 36 of the molded foam 30. When the molded foam 30 is used as a vehicle seat, the present embodiment prevents a part of the upper seat member 50 placed on the molded foam 30 from being caught into the recesses 36 and thus giving uncomfortableness to the passenger sitting on the seat.

As compared with a molded foam without the recesses 36 and an ejector pin 60 having the entire surface parallel to the outer surface of the molded foam (i.e., the entire tip surface 61 is inclined), this configuration keeps an enough component of the pressing force against the molded foam 30 in the mold opening direction and makes the component in the direction perpendicular to the mold opening direction (extrusion direction) smaller. This configuration suppresses slipping of the tip surface 61 of the ejector pin 60 on the outer surface of the molded foam 30, and thus suppresses scratches on the outer surface of the molded foam 30 or degradation of the releasability of the molded foam 30.

The tip surface 61 includes the first extruding surface 61a perpendicular to the mold opening direction and the second extruding surface 61b that forms a part of the inclined face 35b, so that not only the first extruding surface 61a but also the second extruding surface 61b extrude the molded foam 30. This suppresses the concentration of a pressing force on the portion of the molded foam 30 pressed by the first extruding surface 61a (bottom face 36b of the recess 36), and thus suppresses a damage of the molded foam 30 during extrusion (during releasing).

In the present embodiment, the first extruding surface 61a has the first end 61c on the opposite side of the second extruding surface 61b, and the second extruding surface 61b has the second end 61d on the opposite side of the first extruding surface 61a. The intersection P between the straight line L61c that passes through the first end 61c and extends in the mold opening direction and the plane S61d that passes through the second end 61d and is perpendicular to the mold opening direction is located outside of the cavity during the molding step S12. As stated above, some molded foams cannot be pressed by the entire tip surface 61 of the ejector pin 60 that is perpendicular to the mold opening direction (i.e., when the entire tip surface 61 of the ejector pin 60 is perpendicular to the mold opening direction, the tip surface 61 partially protrudes from the molded foam 30). In this case, the tip surface 61 of the ejector pin 60 having the first extruding surface 61a perpendicular to the mold opening direction and the second extruding surface 61b inclined relative to the first extruding surface 61 is very effective.

In the present embodiment, the second extruding surface 61b is inclined by 20° or more and 70° or less relative to the first extruding surface 61a. That is, the inclined face 35b of the molded foam 30 is inclined by 20° or more and 70° or less relative to the direction perpendicular to the mold opening direction. In this way, when the inclined face 35b of the molded foam 30 is inclined by 20° or more relative to the direction perpendicular to the mold opening direction, the recess 36 will become very deep to have the entire tip surface 61 of the ejector pin 60 to be perpendicular to the mold opening direction and to press the molded foam 30 with the entire tip surface 61 of the ejector pin 60. Or the molded foam 30 may not have the recess 36 and the entire tip surface 61 of the ejector pin 60 may be formed parallel to the outer surface of the molded foam 30. In this case, the pressing force of the molded foam 30 in the direction perpendicular to the extrusion direction (mold opening direction) will increase. In this way, when the second extruding surface 61b is inclined by 20° or more relative to the first extruding surface 61a, the tip surface 61 of the ejector pin 60 having the first extruding surface 61a perpendicular to the mold opening direction and the second extruding surface 61b inclined relative to the first extruding surface 61a is very effective.

When the inclined face 35b of the molded foam 30 is inclined by 70° or less relative to the direction perpendicular to the mold opening direction, not only the first extruding surface 61a but also the second extruding surface 61b extrude the molded foam. This configuration therefore suppresses the concentration of a pressing force on the portion of the molded foam 30 pressed by the first extruding surface 61a (bottom face 36b of the recess 36).

The present embodiment is configured so that, viewed from the mold opening direction, the area ratio of the first extruding surface 61a to the tip surface 61 is 25% or more. This configuration easily achieves the force of extruding by the first extruding surface 61a. The present embodiment is configured so that, viewed from the mold opening direction, the area ratio of the first extruding surface 61a to the tip surface 61 is 75% or less. This configuration easily suppresses an increase of the recess 36 in size.

In the molding step S12 of the present embodiment, the ejector pin 60 forms a part of the thin portion of the foam molded body 30. That is, the ejector pin 60 presses on the thin portion of the molded foam 30. In this case, the tip surface 61 of the ejector pin 60 having the first extruding surface 61*a* perpendicular to the mold opening direction and the second extruding surface 61*b* inclined relative to the first extruding surface 61*a* is very effective.

The embodiment disclosed here is to be considered in all respects as illustrative and not restrictive. The scope of the present disclosure is defined by the claims and not by the embodiment, and is intended to include any modification within the meaning and scope equivalent to the terms of the claims.

For example, the above embodiment describes an example of using the molded foam 30 for the vehicular seat member 10, and the present invention is not limited to this example. The molded foam of the present invention is applicable to a box for packing an object and other members.

The above embodiment describes an example of attaching the frame member 20 to the groove 31*a* of the molded foam 30, and the present invention is not limited to this example. A part or substantially all of the frame member 20 may be embedded in the molded foam 30. In this case, the frame member 20 may be placed first at a predetermined position in the mold 40, and then the molded foam 30 may be formed in the mold 40.

The above embodiment describes an example of including two ejector pins 60 each having a first extruding surface 61*a* and a second extruding surface 61*b*. The present invention is not limited to this, and one or three or more ejector pins 60 may be used.

The above embodiment describes an example of including the ejector pins 60 placed at the fixed mold 41. The present invention is not limited to this, and the ejector pins 60 may be placed at the mobile mold 42.

REFERENCE SIGNS LIST

10 Vehicular seat member
30 Molded foam
35*b* Inclined face
36 Recess
36*b* Bottom face
37 Pin mark
37*a* First region
37*b* Second region
37*c* First end
37*d* Second end
40 Mold
41 Fixed mold (mold)
42 Mobile mold (mold)
60 Ejector pin
61 Tip surface
61*a* First extruding surface
61*b* Second extruding surface
61*c* First end
61*d* Second end
S Outer shape
S12 Molding step
S13 Releasing step
S37*d*, S61*d* Plane
L37*c*, L61*c* Straight line
P Intersection

The invention claimed is:

1. A molded foam comprising:
an inclined face that is configured to be inclined relative to a mold opening direction of a mold;
a first recess on the inclined face, the first recess being configured to let an ejector pin extrude the molded foam;
a pin mark configured to be formed by a tip surface of the ejector pin; and
a second recess that is opposite to the first recess, with a part of the molded foam between the first recess and the second recess,
wherein:
the pin mark has: a first region that is configured to be perpendicular to the mold opening direction and defines a semicircular bottom face of the first recess; a second region that is inclined relative to the first region and defines a part of the inclined face; and a straight line portion that divides the pin mark between the first region and the second region;
the first recess includes: (i) the semicircular bottom face that is flat; and (ii) a side face that is a part of a cylindrical surface and configured to extend in the mold opening direction, and includes a first arc portion that adjoins the semicircular bottom face and connects respective ends of the straight line portion;
the second region includes a semicircular inclined face defined by a second arc portion that adjoins the semicircular inclined face and connects the respective ends of the straight line portion;
in a cross section of the molded foam including the first region and the second region, the first region has a first end on a first side opposite to the second region;
the second region has a second end on a second side opposite to the first region; and
a straight line that passes through the first end and is configured to extend in the mold opening direction and a plane that passes through the second end and is configured to be perpendicular to the mold opening direction intersect in the second recess.

2. The molded foam according to claim 1, wherein the second region is inclined by 20° or more and 70° or less relative to the first region.

3. The molded foam according to claim 1, wherein, viewed from the mold opening direction, an area ratio of the first region to the pin mark is 25% or more and 75% or less.

4. The molded foam according to claim 1, wherein the molded foam has:
an oblong outer shape having, in a plan view, transverse sides and longitudinal sides;
a first part on a first of the transverse sides; and
a second part on a second of the transverse sides,
wherein:
the transverse sides are shorter than the longitudinal sides;
the second part is thinner than the first part; and
the recess and the pin mark are at the second part.

5. The molded foam according to claim 1, wherein the second recess includes a top face that is configured to be perpendicular to the mold opening direction, and a side face that is configured to extend in the mold opening direction from an end of the top face.

6. The molded foam according to claim 5, further comprising an upper end face, wherein:
the inclined face extends downward from the upper end face;
a groove is defined in the upper end face; and
the top face of the second recess is configured to be underneath the groove in the mold opening direction.

7. The molded foam according to claim 1, further comprising an upper end face, wherein:
   the inclined face extends downward from the upper end face; and
   a groove is defined in the upper end face.

\* \* \* \* \*